Sept. 19, 1967 W. ULRICH 3,343,138

DATA PROCESSOR EMPLOYING DOUBLE INDEXING

Filed Oct. 7, 1964

2 Sheets-Sheet 1

INVENTOR
W. ULRICH
BY John C Albrecht
ATTORNEY

DATA PROCESSOR EMPLOYING DOUBLE INDEXING

Filed Oct. 7, 1964 2 Sheets-Sheet 2

3,343,138

DATA PROCESSOR EMPLOYING DOUBLE INDEXING

Werner Ulrich, Colts Neck, N.J., assignor to Bell Telephone Laboratories, Incorporated, New York, N.Y., a corporation of New York Filed Oct. 7, 1964, Ser. No. 402,272
13 Claims. (Cl. 340—172.5)

ABSTRACT OF THE DISCLOSURE

I disclose a data processor in which the index adder has the capability to add three pieces of information, rather than the standard two. This is accomplished by transmitting to the index adder the contents of a specified index register, a portion of the constant field of the instruction word, and a portion, determined by the remainder of the constant field, of another index register. Operating in this manner allows the execution with one instruction of what would normally require two instructions.

Figure 1:
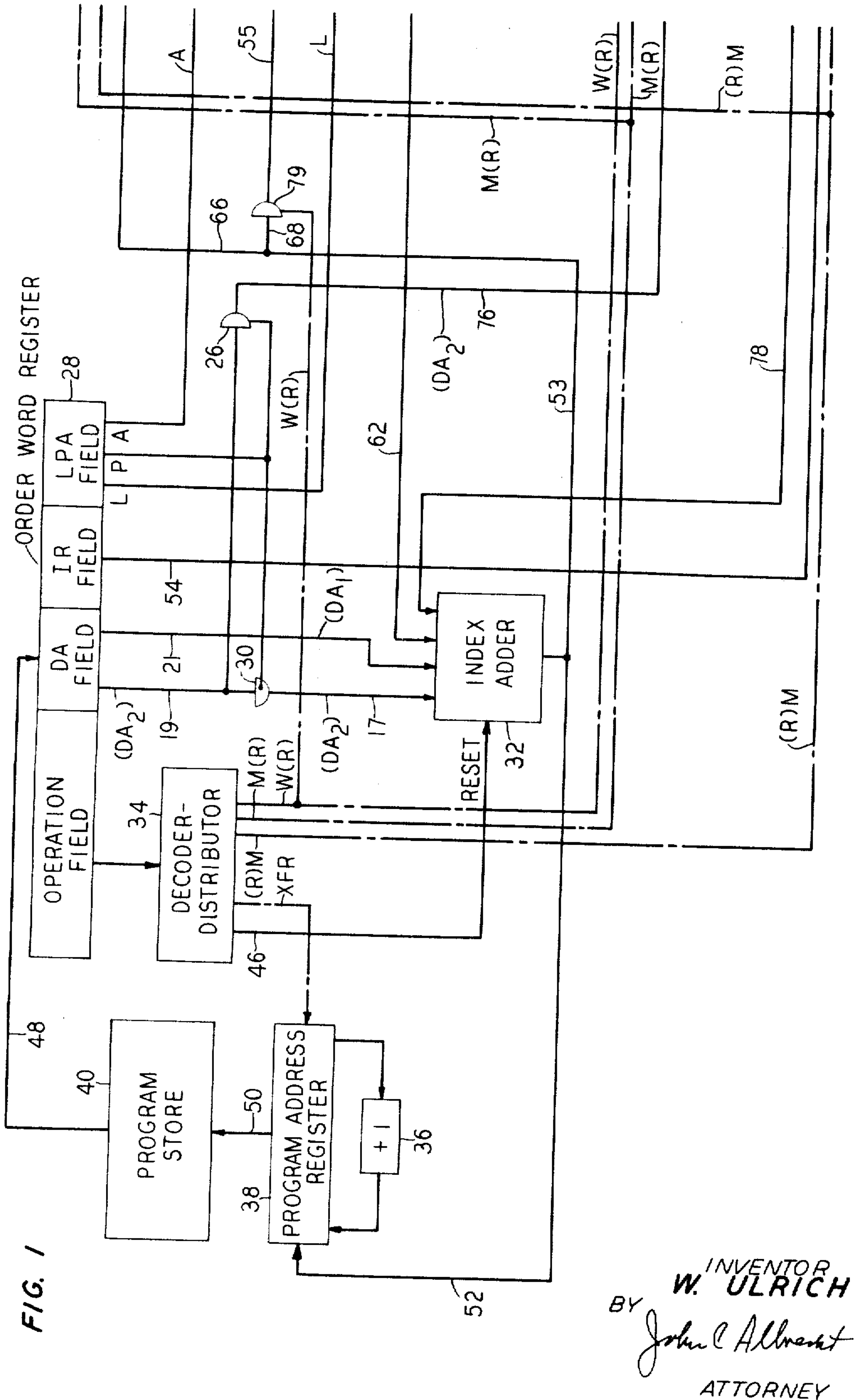

This invention relates to data processors and more particularly to data processors in which three variables may be added together in the indexing step of the execution of a machine order.

The operation of a data processor is generally controlled by a sequence of instruction words. Each instruction word comprises a series of fields. In the various fields of an instruction word there are usually included operation, data-address and index register, or equivalent, fields. The operation field specifies the type of order to be executed by the machine, e.g., read, shift, etc. The data-address field is a constant which is used in the execution of the order. This field represents either data, e.g., data to be written into one of the machine registers, or an address, e.g., the address in memory at which a register word is to be written. The index register field identifies one of the machine registers whose contents are to be added to the data-address field to derive the effective data-address field which is actually used in the execution of the order. Indexing is thus a step in the execution of an order which controls the modification of the data-address field in the instruction word by the addition to it of the data in the index register specified in the index register field of the instruction word.

In the indexing step of the execution of an order in conventional prior art machines the data-address field may be modified by the entire contents of usually only one of the index registers. The prior art indexing operation may be understood by considering two examples. Suppose the operation field of an instruction word reprents an order to store the data-address field of the instruction in a first one of the machine registers. The index register field specifies a second one of the machine registers. In the indexing step during the execution of the order the data-address field in the instruction word is added to the data word in the second register, in the index adder. The sum is the data word which is stored in the first register. Thus the data-address field (treated as data rather than an address) of the instruction word is modified by the contents of an index register before it is written into another one of the system registers. On the other hand, the data-address field in the instruction word might represent an address in the data store. The operation field might specify an order to write the data word contained in a first one of the registers into the data store. The index register field specifies a second register. In the indexing step the contents of the second register are added to the data-address field (treated as an address rather than data) of the instruction word. The sum is the effective or actual address of the data store location into which the data word in the first register is written.

In many situations it is necessary to add three variables to derive the effective data or the effective address which is to be used in the execution of an order, with one of the variables being only a part of a data word stored in one of the machine registers. Suppose for example it is necessary to add together the data-address field of an instruction, the full data word in one of the index registers and a part of the data word in another. In such a situation in order to derive an effective data-address field it is necessary to execute two orders. When the first order is executed the data-address field in the instruction is added to the data word in the index register whose identity is specified in the index register field of the same instruction. Another order then must be executed during which the previously derived data-address field is added to the desired part of the data word in the second index register to derive the final effective data-address field which is required. At least two orders must be executed in conventional machines to derive an effective data-address field which is the sum of three variables of the type described because during the indexing step in the course of executing a single order the data-address field in the instruction may be added only to the full data word contained in a machine register.

It is an object of this invention to provide a data processor in which data in two of the machine registers may be added to the data-address field of an instruction word to derive an effective data-address field in the execution of a single order.

It is another object of this invention to allow only a selected portion of the data in one of the registers to be added to the data-address field of an instruction word.

In accordance with the principles of my invention the data-address field of an instruction word comprises two parts or subfields, represented as $DA_1$ and $DA_2$. Normally both parts of the data-address field (hereinafter represented as the DA field) are transmitted to the index adder, to be added to the contents of the register specified in the index register field of the instruction word. However, when three variables must be added together in an indexing step only the first part of the total DA field, $DA_1$, is transmitted directly to the index adder. The index register field controls the transmission to the index adder of the data word in the specified index register. The other part of the DA field, $DA_2$, controls the transmission to the index adder of a third piece of information contained in another one of the index registers. Whenever the actual data-address field to be used in the indexing step is short enough to be contained in only the first part of the field, the second part may be used to control the transmission to the index adder of a third variable.

As will be seen below, even when it is necessary to add together three variables in the indexing step one of the variables is often only a few of the least significant bits in one of the index registers. For example it may be necessary in deriving the effective data-address field to add together $DA_1$, the full data word in the index register specified in the index register field, and only some of the least significant bits in a second index register. In the illustrative embodiment of the invention the third variable which is transmitted to the index adder under the control of the $DA_2$ subfield always comes from the same register, which may be labeled the Z register. The $DA_2$ field specifies the number of the least significant bits in the Z register which are to be transmitted to the index adder. If in deriving the effective data-address field to be used in the execution of the order it is necessary to add together $DA_1$, the full data word in the index register specified in the index register field, and the first four bits in the Z register, the $DA_2$ part of the data-address field in the instruction word controls the transmission of only the four least significant bits in the Z register to the index adder.

As will also become apparent below, three variables often must be added together during the indexing steps of the executions of successive orders. Before a series of these orders is executed the third variables to be used in the executions of these successive orders may all appear in sequence in the Z register. For example, the four least significant bits in the Z register might be required as the third variable in the indexing step of the execution of the first order, the next five bits in the Z register might comprise the third variable required in the indexing step of the execution of the second order, etc. The $DA_2$ subfield controls the transmission of only a specified number of the least significant bits in the Z register to the index adder. When the first order is executed if the $DA_2$ subfield of the instruction represents the number 4, the four least significant bits in the Z register are transmitted to the index adder as required. In the execution of the next order it is necessary to transmit the fifth through ninth bits in the Z register to the index adder. The $DA_2$ subfield of the second order represents the number 5. But under control of the $DA_2$ subfield only the five least significant bits in the Z register are transmitted to the index adder. For this reason before the second order is executed it is necessary to shift the data word in the Z register four positions in the direction of least significance in order that the fifth through ninth bits will appear in the five least significant stages of the Z register. In the illustrative embodiment of the invention each $DA_2$ subfield not only controls the transmission of the specified number of the least significant bits in the Z register to the index adder, but in addition controls the shifting of the data word in the Z register in the direction of least significance by the number of bits specified in the $DA_2$ subfield. Thus in the example chosen when the first order is executed the four least significant bits in the Z register are transmited to the index adder, and immediately thereafter the data word in the Z register is shifted four positions to the right (the direction of least significance). When the next order is executed the $DA_2$ subfield specifies the number 5. The five least significant bits in the Z register, the third variable required in the indexing step, are transmitted to the index adder. Immediately thereafter the remaining bits in the Z register are shifted five positions to the right. The third variable required in the execution of the next order thus appears in the least significant bits of the Z register, and the $DA_2$ subfield in the third instruction controls the transmission to the index adder of the required third variable.

It is possible, as an alternative design, to omit the shifting operation and instead to represent in the $DA_2$ subfield not only the number of bits in the Z register required for indexing but in addition the positions of these bits. This design would not require the shifting circuitry but would require circuitry which would be capable of reading any series of bits in the Z register and transmitting them to the index adder. In the illustrative embodiment of the invention the shifting circuitry permits the desired operation with a simple read circuit, which circuit must be capable of readng only the least significant bits in the Z register. The read circuit must be designed in any given system to read a number of least significant bits in the Z register which is equal to the maximum number of bits ever required as the third variable in an indexing step.

It is a feature of this invention to divide the data-address field of an instruction word into two parts, both of which are normally transmitted to the index adder; and in certain circumstances the first part of which is transmitted directly to the index adder and the second part of which controls the transmission to the index adder of a number of the least significant bits in one of the machine registers.

It is another feature of this invention, in the illustrative embodiment thereof, to shift the data word in the same index register in the direction of least significance a number of positions equal to the number of bits represented in the second part of the data-address field.

Figure 2:
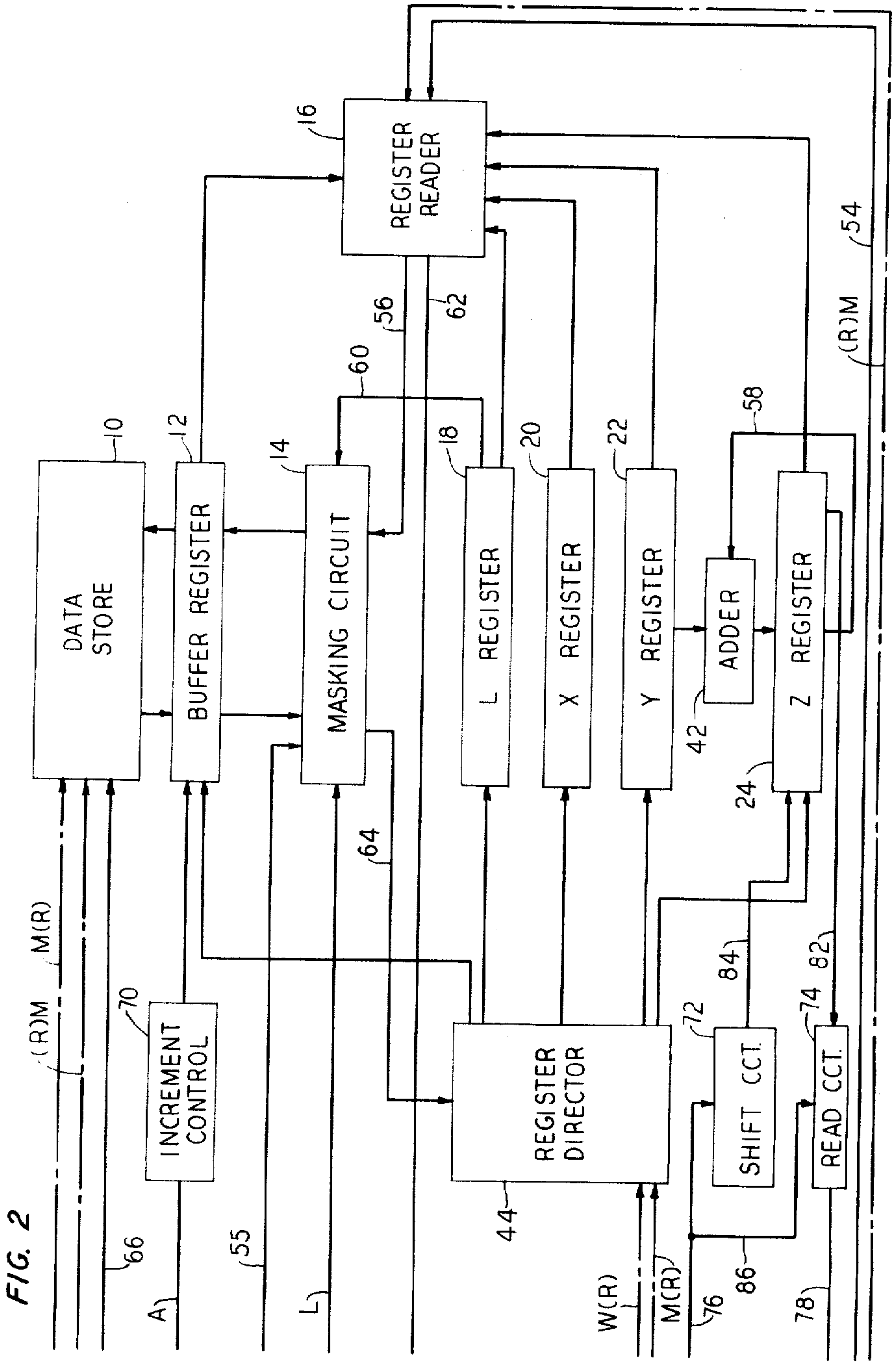

Further objects, features and advantages of the invention will become apparent upon consideration of the following detailed description in conjunction with the drawing in which:

FIGS. 1 and 2 (with FIG. 1 being placed to the left of FIG. 2) are a block diagram schematic of an illustrative data processor incorporating the principles of the invention.

Only those parts of the system are shown which are required for an understanding of the present invention. For example, the time of operation of each unit in the system may be controlled, as is well known in the art, by a timing network. This network is not shown in the drawing as it is not necessary for an understanding of the subject invention. A specific data processor in which my invention may advantageously be employed is disclosed in Doblmaier et al. application Ser. No. 334,875, filed Dec. 31, 1963, and such disclosure is hereby incorporated herein.

Program store 40 contains a series of instruction words which are transmitted successively over cable 48 to order word register 28. The particular instruction word which is contained in the order word register controls the operation of the various units in the system. The storage address of the instruction which is transmitted to the order word register is contained in program address register 38. The address is transmitted over cable 50 to the program store, the program store in turn forwarding the instruction contained in the particular store location to the order word register. The address in register 38 is continuously incremented by increment circuit 36. Since successively numbered addresses are contained in register 38, successively stored instructions are transmitted to the order word register. It is possible in the system to control the transmission to the order word register of an instruction word not in sequence. An address may be transmitted to program address register 38 over cable 52. If order cable XFR is energized this address is written into the program address register, and the respective instruction is transmitted to the order word register. It is this address which is then incremented to control the transmission to the order word register of instructions stored in successive addresses or locations in the program store.

Each instruction word consists of four parts—operation, DA, IR and LPA fields. The operation field is a code (invariably numerical, as are the other fields) which determines which of the system units operate in executing the order specified by the particular instruction word. Decoder-distributor 34 determines from the operation field code the order which is to be executed. One of four order cables, shown in dotted lines in the drawing, is energized and carries the information required for executing the order to the various system units which require it. Although only four orders may be executed in the system shown it should be noted that the invention is equally applicable to systems in which many more types of operations are provided.

At the same time that the operation field is sent to decoder-distributor 34 the $DA_1$ subfield of the DA field is transmitted over cable 21 directly to index adder 32. Gate 30 is normally enabled. It is inhibited from operating only if the P bit in the LPA field in order word register 28 is a 1. If the P bit is a 0 the $DA_2$ subfield of the DA field is also transmitted to index adder 32. Thus if the P bit is a 0 the entire DA field is transmitted to the index adder. The DA field specifies either data or an address. Index adder 32 adds the number contained in the DA field of the instruction word to the contents of one of a series of index registers provided in the system. Register reader 16 reads the contents of buffer register 12, L register 18, X register 20, Y register 22, or Z register 24. A respective cable is connected from each of these five registers to the register reader. The IR field in the instruction word specifies none (if it is blank) or one of these five registers, and the contents of the register specified are transmitted over cable 62 to index adder 32. If no register is specified in the IR field of the instruction word, no bits are transmitted over cable 62 to the index adder. The index adder derives the sum of the numbers contained in the DA field of the instruction word and the specified register. The sum at the output of the index adder is transmitted to various units in the system. The only unit which operates on this indexed data or address word is the unit which is enabled by the energized one of the four order cables.

A word may be transmitted to register director 44 from masking circuit 14. The register director operates when either order cable M(R) or W(R) is energized. Information is transmitted to the register director from the decoder-distributor over the energized order cable which identifies either the buffer register, or one of the L, X, Y and Z registers. The input word to the register director on cable 64 is transmitted to the register specified by the order cable information over one of five respective register director output cables.

Index adder 32 is not used in the system for adding two data words. The index adder is provided only to modify the DA field of an instruction word in accordance with the contents of one (or two, as will be seen below) of the system registers. Adder 42 is provided for deriving the sum of two data words. Whenever a new word is written into the Y register by the register director the word is transmitted to adder 42. The Z register is connected to adder 42 by cable 58 for transmitting to the adder the word stored in the Z register. Whenever a new word is written into the Y register the adder adds this word to the word in the Z register and the sum is transmitted to and stored in the Z register. The new word remains in the Y register, and the Z register contains the sum of the new word and the previous contents of the Z register. Thus addition of two data words is accomplished by first controlling the register director to write one of them in the Z register, and then controlling the register director to write the other in the Y register. Whenever the register director writes a word in the Z register adder 42 does not operate. Addition of two data words occurs only when a word is first written in the Y register.

In many data processsing machines a product mask option is available on various types of orders. The logical product is formed of respective bits in the mask and data words. The resulting masked data word has a 1 in only those positions for which the respective mask and data words both contain binary 1's. For example, in a six-bit machine the data word 101011 might be transferred from the data store to a register. In the course of the transfer the word passes through the masking circuit. Suppose the mask used by the masking circuit is 011110. The resulting masked data word stored in the register is thus 001010.

Whenever the mask option is required the mask word must first be stored in the L register. The L register is connected by cable 60 to masking circuit 14 and controls the masking of the word transmitted through the masking circuit. The masking circuit is bidirectional. A word transmitted from register reader 16 to the masking circuit over cable 56 may be masked by the mask in the L register before it is stored in buffer register 12. Similarly, the word in the buffer register or on cable 55 may be masked in the masking circuit and transmitted over cable 64 to register director 44, from which it is directed to one of the five storage registers in the system. (It may be directed back to the buffer register as well as to one of the other four registers.) Masking circuit 14 masks the word passing through it by the mask in the L register only if the L bit in the LPA field in order word register 28 is a 1. The L bit is transmitted over the L conductor to the masking circuit and if this bit is a 0 the masking circuit allows the data word to be transmitted through it unchanged.

The buffer register itself is a buffer between data store 10 and the rest of the system. The data which is to be operated upon by the data processor is contained in data store 10. An address is transmitted from index adder 32 to data store 10 over cables 53 and 66. If a word is to be read out of the data store, order cable M(R) is energized, and the word contained in the specified data store location is transmitted to buffer register 12. When a word is to be written into the data store, order cable (R)M is energized and the word stored in the buffer register is written into the specified data store location. Data store 10 may include input/output equipment of the type described in my copending application Ser. No. 402,090, filed Oct. 7, 1964.

When a word is transmitted from the data store to the buffer register it is automatically transmitted out of the buffer register to the masking circuit. Similarly, when a word is transmitted from the register reader through the masking circuit to the buffer register, the word is automatically transmitted from the buffer register to the data store. In both cases the data word also remains in the buffer register. A word is transmitted from the register reader through the masking circuit to the buffer register when the word in one of the registers is to be written into the data store. It may be desired to operate once again on this word, e.g., by controlling increment circuit 70 to add a 1 to the word, and for this reason the word also remains stored in the buffer register. Similarly, when a data word is first read out of the data store, through the buffer register, masking circuit 14 and register director 44 to one of the registers, it may be desired to operate on the original word in the buffer register. For example, the data word read might be masked and stored in the X register. The original data word remains in the buffer register for possible incrementation and restorage in the data store. Similarly, when register reader 16 reads a data word out of the buffer register the contents of the buffer register remain unchanged. In fact, the contents of the other registers also remain unchanged when register reader 16 reads a data word out of one of them.

Index adder 32 must be reset prior to the execution of an order. The output of the index adder which would otherwise remain would be that derived during the indexing step of the execution of the previous order. Decorder-distributor 34 applies a reset pulse to conductor 46 whenever a new instruction word is transmitted to order word register 28. This reset pulse is transmitted to the index adder and resets the index added prior to the execution of the new order.

The LPA field of the instruction word in the order word register contains three bits of information which control the energization of the three respective L, P and A conductors. The energization of the L conductor controls the operation of masking circuit 14 as described above. The A bit, when a 1, controls increment control circuit 70 to add a 1 to the contents of the buffer register before the order itself is executed. The P bit controls the transmission of the $DA_2$ subfield to either index adder 32 or to shift control circuit 72 and read circuit 74. If the P bit is a 0 gate 30 is enabled and gate 26 is inhibited from operating. The $DA_2$ subfield on cable 19 passes through gate 30 to cable 17 and index adder 32. If the P bit is a 1 gate 30 is inhibited from operating and gate 26 is enabled. In the latter case the $DA_2$ subfield is transmitted over cables 76 and 86 to shift circuit 72 and read circuit 74.

The operation of the system may be best understood by considering on an individual basis the manner in which each of the four types of orders is executed. In the following analysis of the four types of orders the P bit is a 0 and the entire DA field in order word register 28 is transmitted to index adder 32. Shift circuit 72 and read circuit 74 do not operate. Following the analysis of the individual orders with the P bit in each case being a 0 the operation of the system when the P bit is a 1 will be described.

A transfer order is one which controls a transfer to a new instruction out of sequence. A typical instruction might be XFR, 500, Y, 000. Decoder-distributor 34 energizes order cable XFR. This order cable is connected only to program address register 38, and enables a new address appearing on cable 52 to be written into the register. Because the P bit is a 0 gate 30 is enabled and the entire DA field is transmitted to the index adder. Decorder-distributor 34 first transmits a reset pulse on conductor 46 to reset the index added. The DA field, 500, is then transmitted, part of it directly and part of it through gate 30, to the index adder. At the same time the identity of the Y register is transmitted over cable 54 to register reader 16. The register reader reads the contents of the Y register, which may for example be the number 25, and transmits this number over cable 62 to the index adder, The index adder modifies the DA field by the contents of the index adder, and the sum 525 appears at the output of the index adder. While this number is transmitted to data store 10 and gate 79, as well as to program address register 38, the data store and gate are not enabled by order cable XFR. The number 525 on cable 52 is written into only program address register 38 because the energized order cable is connected only to this unit. The next instruction transmitted over cable 48 to the order word register is that one stored in the location in the program store whose address is 525. It is this address which is thereafter incremented in the program address register.

When a transfer order is executed the L bit may be a 1 but even if it is it has no effect on the system. A word is transmitted through the masking circuit only when register reader 16 operates on an (R)M order, gate 79 is enabled on a W(R) order, or when a word is first written into the buffer register from the data store when an M(R) is executed, the word automatically being transmitted from the buffer register to the masking circuit. When a transfer order is executed no word is transmitted to the masking circuit, and thus even if the L bit is a 1 there is no word which the masking circuit may mask.

It should be noted that register reader 16 applies the contents of the register specified in the IR field to cable 62 for transmission to the index adder. On an (R)M order the register reader also applies a word to cable 56, but this operation is controlled by the (R)M order cable. When a transfer order is executed only order cable XFR is energized, and the register reader only applies the contents of the register specified in the IR field to cable 62. The address in the DA field of the instruction word may be modified by the contents of the specified register, and it is this modified address to which the transfer is effected.

When the word contained in the DA field of an instruction word is to be written into one of the five registers, order cable W(R) is energized. The actual operation field code which appears in the order word register is either WB, WL, WX, WY or WZ. The (R) in the label W(R) indicates that any one of five particular codes may appear in the operation field of the instruction word. The B in the WB code specifies that the DA field is to be written into the buffer register.

When a W(R) order is executed the IR field again specifies that one of the five registers whose contents are to be added to the DA field in the indexing step. The sum word is stored in the register whose identity is contained in the operation field. Register reader 16 reads the word stored in the specified one of registers 12, 18, 20, 22 and 24, and transmits the word over cable 62 to index adder 32. The DA field transmitted to the index adder is added to the data word transmitted to index adder 32 over cable 62. Program address register 38 and data store 10 are not enabled when a W(R) order is executed. Register director 44 is enabled however by the W(R) order cable, and is notified of the identity of either the buffer register or one of the L, X, Y and Z registers. The modified DA field is transmitted through enabled gate 79 to masking circuit 14, and from the masking circuit to the register director over cable 64. The register director writes the word into one of the five registers in accordance with the particular one of the five W(R) orders being executed.

Order cable W(R), when energized, enables gate 79. Only when a W(R) order is executed is the output of the index adder transmitted over cable 55 to the masking circuit. If the L bit is a 1 word passing through the masking circuit is masked by the mask in the L register. The resulting masked word is stored in the register specified in the operation field.

The DA field may comprise all 0's. In this case the output of the index adder is merely the contents of the register specified in the IR field. The W(R) order may thus be used to transfer a data word from one register to another.

The A bit may be a 1 when a W(R) order is executed. If it is, it merely controls the incrementing of the word in the buffer register prior to the execution of the order. If a WB order is executed however even if the A bit is a 1 it has no effect on the system. The contents of the buffer register are incremented, but immediately thereafter the register director writes the transferred word into the buffer register and the original incremented word is erased. For this reason the A bit should be a 0 whenever a WB order is executed.

The third type of order controls the reading of a word in the data store and its writing into one of the five registers. The M(R) order cable is energized whenever an MB, ML, MX, MY or MZ order is executed. The second letter in the operation field of the instruction word represents the register into which the data or memory store word is to be written. The register identity is transmitted along the order cable to register director 44.

The IR field represents that one of the five registers whose contents are to be transmitted to the index adder to be used in the indexing step. As in the execution of XFR and W(R) orders, after the index adder is reset the DA field is added in the index adder to the contents of the register specified in the IR field. The sum is transmitted to data store 10 over cables 53 and 66 and represents the address in the data store whose contents are to be transmitted to buffer register 12. The word is then automatically transmitted from the buffer register through the masking circuit to register director 44. The word is masked by the contents of the L register only if the L bit in the LPA field of the instruction word is a 1. The masked word on cable 64 is then directed by register director 44 to that one of the five registers identified in the operation field. It should be noted that the index adder output on cable 68 is transmitted to gate 79 as well as to the data store. However, when an M(R) order is executed gate 79 is not enabled.

When an M(R) order is executed the A bit may be a 1, but even if it is, it has no effect on the system. If it is a 1, before the order is executed the contents of the buffer register are incremented. However, the word in the buffer register is erased when the new word from the data store is first placed in the buffer register. For this reason there is no reason to increment the original contents of the buffer register in the first place, and on an M(R) order the A bit should be a 0.

The fourth type of order which may be executed is an (R)M order which controls the storage of the word contained in a specified one of the five registers in the data store. Suppose the order ZM, 500, Y, 100, is executed, and the contents of the Y register are 25. Because the P bit is a 0 the entire DA field, 500, is transmitted to the index adder. At the same time register reader 16 delivers the contents of the Y register to the index adder over cable 62. The sum derived by the index adder, 525, is transmitted over cables 53 and 66 to data store 10. The (R)M order cable is energized and notifies the data store that the number 525 is the address of the location into which the word next to be written in the buffer register is to be stored. The ZM code in the operation field controls the transmission over the (R)M order cable to register reader 16 of a command to read the contents of the Z register and to apply the data word to cable 56. The register reader operates twice in succession, first in response to the Y code in the IR field, and then in response to the Z code in the operation field, with the contents of the Y register being applied to cable 62 and the contents of the Z register being applied to cable 56. The word in the Z register is transmitted through masking circuit 14 to buffer register 12, and because the L bit is a 1 it is masked by the contents of the L register. The masked word transmitted to the buffer register is then written into the location in the data store whose address is 525.

Thus far the operation of the system has been considered when the instruction word in order word register 28 contains a 0 in the P field. The index adder has four linputs, cables 21, 17, 62 and 78. When the P bit is a 0 the $DA_1$ and $DA_2$ subfields are transmitted to the index adder over cables 21 and 17 and the contents of the register specified in the IR field of the instruction word are transmitted to the index adder over cable 62. Nothing is transmitted to the index adder over cable 78 and the index adder derives the sum of only the DA field in the order word register and the data word in the index register specified in the IR field. When the P bit is a 1 however only the $DA_1$ subfield is transmitted to the index adder. The $DA_2$ subfield is transmitted through gate 26 and over cables 76 and 86 to shift circuit 72 and read circuit 74. Read circuit 74 is connected to the stages in the Z register containing the least significant bits. The number of stages to which the read circuit is connected depends on the maximum number of bits to be transmitted from the Z register to the index adder in any given application. The $DA_2$ subfield specifies a number of bits, e.g., 4. Read circuit 74 reads the four least significant bits in the Z register and transmits them over cable 78 to index adder 32. The contents of the specified index register, as usual, appear on cable 62. The index adder then derives the sum of the $DA_1$ subfield, the data word on cable 62 and the four bits on cable 78. The DA field in the instruction word, or more precisely, the $DA_1$ subfield, is thus modified not only by the data word contained in the index register specified by the IR field, but in addition by the four least significant bits in the Z register.

Immediately after the operation of read circuit 74 shift circuit 72 operates. Shift circuit 72 transmits control signals over cable 84 to the Z register. The word in the Z register is shifted to the right, the direction of least significance. The magnitude of the shift is dependent upon the number of least significant bits read by read circuit 74. In the example selected the data word in the Z register is shifted four positions to the right. This shift operation is in preparation for the next order. The least significant bits in the Z register after the indexing step are shifted out of the register. The bits which may next be required in an indexing step are placed in the least significant stages of the Z register. In this manner these bits may be read out of the Z register by read circuit 74 even though the read circuit is connected by cable 82 to only the least significant stages of the Z register.

The utility of my invention may be best appreciated by considering a specific example. Data processing equipment is being used more and more in the communications field. A data processor may be used for instance in determining the availability of a path through a telephone switching network. Suppose that in a particular network there are four stages each including many link groups, there being eight cross-points in each link group. A path may be completed through the network only if the same numbered crosspoint is available in one link group of each of the four stages. The state (available or unavailable) of each crosspoint may be represented by one of the two binary numbers, a 1 indicating that the crosspoint is available and a 0 indicating that it is not. Four eight-bit data words may represent the states of the crosspoints of four link groups. To determine the availability of one of the eight paths through these four link groups it is only necessary to verify that a 1 exists in the respective position in each of the four data words. Thus if the four words representing the states of the crosspoint are 11100000, 11011110, 01111101 and 11110011, it is apparent that the only path available is that comprised of the four crosspoints the states of which are represented by the next to the most significant bit in each of the four eight-bit words.

The available path or paths may be determined as follows. The logical product of the first two eight-bit words is formed. The result is 11000010. The logical product of this product and the third word is then formed. The logical product of 11000010 and 01111101 is 01000000. Finally, the logical product of this product and the fourth word is then formed. The result, 01000000 verifies that the only available path through the four link groups is the one utilizing the four crosspoints whose states are represented by the second leftmost bit in each of the four eight-bit words.

For purposes of explanation the octal code will be used below. The Z register, for example, contains 24 bits, but an eight digit octal code is sufficient to represent any data word in the register. Addresses are also represented in the octal code. For example, address 100 is equivalent to decimal address 64.

Suppose the illustrative data processor of the invention is used to determine the availability of a path through a switching network. The eight-bit words representing the states of respective link groups may be stored (after being updated) in the data store in a series of tables. Assume that there are four tables A–D each associated with 100 link groups. The word defining the state of each of the eight crosspoints in a particular link group is hereinafter termed a "state word." Each state word is represented by a symbol such as $W_{A33}$. The subscripts A–D indicate whether the state word is associated with the first, second, third or fourth stage in the particular network. One of the numbers 00–77 in the subscript indicates with which one of the 100 link groups the state word is associated. Thus the state word $W_{A33}$ is associated with the eight crosspoints in the 33rd link group of stage A.

The 400 state words are stored in data store 10 in four tables A–D, each having 100 words. The first word in table A is stored in location 1000, and the last word in table D is stored in location 1377. Thus the 400 state words in the memory are stored in the following manner:

| *Address:* | State word |
|---|---|
| 1000 | $W_{A00}$ |
| 1001 | $W_{A01}$ |
| . | . |
| . | . |
| . | . |
| 1077 | $W_{A77}$ |
| 1100 | $W_{B00}$ |
| 1101 | $W_{B01}$ |
| . | . |
| . | . |
| . | . |
| 1177 | $W_{B77}$ |
| 1200 | $W_{C00}$ |
| 1201 | $W_{C01}$ |
| . | . |
| . | . |
| . | . |
| 1277 | $W_{C77}$ |

| *Address:* | State word |
|---|---|
| 1300 | $W_{D00}$ |
| 1301 | $W_{D01}$ |
| . | . |
| . | . |
| . | . |
| 1377 | $W_{D77}$ |

Suppose it is necessary to determine whether an available path exists through link group 35 in stage A, link group 62 in stage B, link group 54 in stage C and link group 28 in stage D. It is necessary to read out of the data store the four state words stored in locations 1035, 1162, 1254 and 1328. The three successive logical products formed from state words $W_{A35}$, $W_{B62}$, $W_{C54}$ and $W_{D28}$ will result in an eight-bit word which will indicate the availability of paths through the four selected link groups in stages A, B, C and D.

In order to transmit any one of these four state words from data store 10 to buffer register 12 and masking circuit 14 it is necessary to specify three pieces of information. First, it is necessary to identify the location in which the first word in table A is stored, location 1000, to distinguish tables A–D from other data which may be contained in data store 10. Second, it is necessary to identify the number of data store locations between location 1000 and the location of the first word in one of the four tables. Thus the second piece of information will always be one of the numbers 0, 100, 200 or 300. The third piece of information is the number of locations separating the desired state word from the first word in the same table, i.e., one of the numbers 00–77. For example, to identify state word $W_{C54}$ the numbers 1000, 200 and 54 must be specified.

In the discussion which follows it is to be remembered that the octal code is used. The LPA field is comprised of three digits (each 0 or 1). The four fields in an instruction word are separated by commas. The $DA_1$ and $DA_2$ subfields are separated by a slash. A 6 in the $DA_2$ subfield corresponds to two octal digits—the bits in the Z register are shifted six positions or two octal positions.

In the course of establishing a call in which the four link groups specified above are being considered the number 28546235 is placed in the Z register. The number 1000 is placed in the Y register. Thereafter, only the following four instructions are required to determine the availability of a path through the four links:

ML, 0/6, Y, 010
ML, 100/6, Y, 110
ML, 200/6, Y, 110
ML, 300/6, Y, 110

The first instruction word to be placed in order word register 28 is the first of the above four. The Y in the IR field causes register reader 16 to transmit the contents of the Y register to index adder 32. The number 1000 thus appears on cable 62. The P bit in the LPA field is a 1 and thus the $DA_1$ subfield, 0, is transmitted to index adder 32 over cable 21, and the $DA_2$ subfield, 2, is transmitted over cables 76 and 86 to shift circuit 72 and read circuit 74. Read circuit 74 reads the two least significant digits in the Z register, 35, and transmits them over cable 78 to the index adder. The index adder then derives the sum of the numbers 1000, 0 and 35. The resulting address 1035 is transmitted to data store 10 over cables 53 and 66 and since order cable M(R) is energized state word $W_{A35}$ is transmitted from data store 10 to the buffer register, and from buffer register 12 to masking circuit 14. The L bit in the order word register is a 0 and consequently state word $W_{A35}$ is not masked by the contents of the L register. The state word passes through masking circuit 14 to register director 44. Because the operation field is ML the state word is stored in the L register. Immediately after the two least significant digits in the Z register are transmitted to the index adder shift circuit 72 operates and causes the contents of the Z register to be shifted two (octal) positions to the right. The digits previously contained in the third and four stages of the Z register are now contained in the first two stages in preparation for the execution of the next order.

The second order executed is similar to the first with three differences. First, the $DA_1$ subfield transmitted over cable 21 to index adder 32 is 100 rather than 0. Second, the octal number 62 is transmitted by read circuit 74 to the index adder. The sum derived by the index adder is thus 1162. Third, the state word $W_{B62}$ read from the data store and transmitted through the masking circuit is now masked by the contents of the L register because the L bit in the LPA field is now a 1. State word $W_{B62}$ is thus masked by state word $W_{A35}$. The resulting masked word on cable 64 is the logical product of the first two state words. This logical product is stored in the L register and replaces state word $W_{A35}$ previously stored therein. Again, shift circuit 72 controls the shifting of the contents of the Z register two digits to the right.

When the third order is executed a similar sequence of events takes place. The only differences are that the $DA_1$ subfield transmitted to the index adder is 200 rather than 100 and the number 54 is sent to the index adder by read circuit 74 rather than the number 62. The output of the index adder is thus 1254 and state word $W_{C54}$ is read out of the data store. This state word is masked by the logical product previously formed and stored in the L register. The resulting logical product is then placed in the L register.

Finally, when the fourth order is executed the output of the index adder is 1328 and state word $W_{D28}$ is read out of the data store. It is masked by the logical product previously stored in the L register. The resulting logical product is stored in the L register. As described above the final logical product is an indication of which paths are available through the selected four link groups. The call may then be established in accordance with succeeding instructions transmitted to the order word register.

For a true appreciation of the advantages of the invention it is necessary to examine the four-instruction subroutine just described in greater detail. It might be asked why it is necessary to make the P bit in each of the instructions a 1 and to transmit the two subfields of the DA field to different units, rather than to transmit successive complete DA fields of 1035, 1162, 1254 and 1328 directly to the index adder. The answer is that the four-instruction subroutine considered above may be used with any four link groups in the four stages. It is only necessary to set up the Z register with the identities of the four link groups being considered. The same subroutine may then be used. Thus the same four instructions are the only ones necessary to determine the availability of a path through stages A, B, C and D in any four link groups. Were triple indexing not provided, and more particularly were the partial Z register indexing not provided, many more instructions would be required to determine the availability of a path through a selected four groups of links.

In the illustrative embodiment of the invention shift circuit 72 always shifts the same bits out of the Z register which are read by read circuit 74. In some applications it may be desired to shift the Z register data word a number of positions which are not the same as the number of bits read out of the register by the read circuit. For example, a particular sequence might require two octal digits to be read out of the register and the data word to then be shifted four octal positions to the right. In such systems the $DA_2$ subfield may include two pieces of information. The first notifies read circuit 74 of the number of bits to be read out of the register. The second notifies shift circuit 72 of the shift magnitude. Similarly, in some applications it may be desired to sometimes control the rotation of the data word in the Z register rather than its shifting, or perhaps to control the movement of the Z register data word to the left rather than the right. In such cases the $DA_2$ subfield may include additional information as to the type of shift operation required with the shift circuit 72 performing the desired operation on the Z register data word in accordance with the command represented in the $DA_2$ subfield.

In the illustrative embodiment of the invention index added 32 must be capable of adding together three numbers, part or all of the DA field, an index register data word transmitted over cable 62, and part of the Z register data word transmitted over cable 78. Adders which are capable of adding together three variables are generally more expansive than adders which are able to add together only two variable. In many applications it is possible to simplify index adder 32. In the telephone system described above suppose that the $DA_1$ subfield always contains at least $n$ octal digits, the least significant $m$ digits ($m$ less than or equal to $n$) of which are always 0's, and no more than $m$ octal digits are ever transmitted from the Z register to the index adder. ($n$ and $m$ may vary from instruction to instruction.) In such a case the $3n$ least significant binary bits in the $DA_1$ subfield are always 0's, and that part of the Z register data word transmitted to the index adder always contains no more than $3n$ binary bits. In such a case it is possible to OR together the conductors carrying the least significant bits in the $DA_1$ subfield and the conductors comprising cable 78. A series of OR gates could be provided and since 1's can appear in the conductors of cable 78 only when the respective conductors in cable 21 contain all 0's, the outputs of the OR gates will in effect be the sum of the two variables. In such a case the index adder would have only two inputs, one for the index register data word on cable 62 and the other for a $DA_1$ word, with the $DA_1$ subfield of the DA word first being modified by the least significant digits in the Z register by means of a series of OR gates.

Although the invention has been described with a certain degree of particularity, it is to be understood that the above-described arrangement is merely illustrative of the principles of the invention. Numerous modifications may be made therein and other arrangements may be devised without departing from the spirit and scope of the invention.

What is claimed is:

1. A data processor comprising
a data word store,
a plurality of index registers,
an instruction word register for representing an instruction word,
means for successively transmitting instruction words to said instruction word register, each of said instruction words having operation, data-address, index register and control bit fields, said data-address field having first and second parts,
an index adder,
means for transmitting the first part of the data-address field of the instruction word in said instruction word register to said index adder,
a read circuit,
means responsive to the control bit field of the instruction word in said instruction word register for selectively transmitting the second part of said data-address field in said instruction word register to said index adder and to said read circuit,
said read circuit being connected to a predetermined one of said index registers and being responsive to the receipt of said second part of said data-address field for transmitting to said index adder a number of the least significant bits in said predetermined index register dependent upon the information contained in said second part of said data-address field,
means for transmitting to said index adder the data word contained in that one of said index registers whose identity is represented in the index register field of the instruction word in said instruction word register,
said index adder deriving the sum of said first part of said data-address field transmitted thereto, the index register data word transmitted thereto, and either said second part of said data-address field transmitted thereto or said number of the least significant bits transmitted thereto from said predetermined index register,
and means responsive to the operation field contained in said instruction word register for storing the data word in a selected one of said index registers in said data word store at the location determined by the sum derived by said index adder.

2. A data processor comprising
a data word store,
a plurality of index registers,
an instruction word register for representing an instruction word,
means for successively transmitting instruction words to said instruction word register, each of said instruction words having operation, data-address, index register and control bit fields, said data-address field having first and second parts,
an index adder,
means for transmitting the first part of the data-address field of the instruction word in said instruction word register to said index adder,
a read circuit,
means responsive to the control bit field of the instruction word in said instruction word register for selectively transmitting the second part of said data-address field in said instruction word register to said index adder and to said read circuit,
said read circuit being connected to a predetermined one of said index registers and being responsive to the receipt of said second part of said data-address field for transmitting to said index adder a number of the least significant bits in said predetermined index register dependent upon the information contained in said second part of said data-address field,
means for transmitting to said index adder the data word contained in that one of said index registers whose identity is represented in the index register field of the instruction word in said instruction word register,
said index adder deriving the sum of said first part of said data-address field transmitted thereto, the index register data word transmitted thereto, and either said second part of said data-address field transmitted thereto or said number of the least significant bits transmitted thereto from said predetermined index register,
and means responsive to the operation field contained in said instruction word register for writing the data word contained in said data word store at a location determined by the sum derived by said index adder in a selected one of said index registers.

3. A data processor comprising
a data word store,
a plurality of index registers,
an instruction word register for representing an instruction word,
means for successively transmitting instruction words to said instruction word register, each of said instruction words having operation, data-address, index register and control bit fields, said data-address field having first and second parts,
an index adder,
means for transmitting the first part of the data-address field of the instruction word in said instruction word register to said index adder,
a read circuit,
means responsive to the control bit field of the instruction word in said instruction word register for selectively transmitting the second part of said data-address field in said instruction word register to said index adder and to said read circuit,
said read circuit being connected to a predetermined one of said index registers and being responsive to the receipt of said second part of said data-address field for transmitting to said index adder a number of the least significant bits in said predetermined index register dependent upon the information contained in said second part of said data-address field,
means for transmitting to said index adder the data word contained in that one of said index registers whose identity is represented in the index register field of the instruction word in said instruction word register,
said index adder deriving the sum of said first part of said data-address field transmitted thereto, the index register data word transmitted thereto, and either said second part of said data-address field transmitted thereto or said number of the least significant bits transmitted thereto from said predetermined index register,
and means responsive to the operation field contained in said struction word register for writing the sum derived by said index adder in a selected one of said index registers.

4. A data processor comprising
a data word store,
a plurality of index registers,
an instruction word register for representing an instruction word,
means for successively transmitting instruction words to said instruction word register, each of said instruction words having operation, data-address, index register and control bit fields, said data-address field having first and second parts,
an index adder,
means for transmitting the first part of the data-address field of the instruction word in said instruction word register to said index adder,
a read circuit,
means responsive to the control bit field of the instruction word in said instruction word register for selectively transmitting the second part of said data-address field in said instruction word register to said index adder and to said read circuit,
said read circuit being connected to a predetermined one of said index registers and being responsive to the receipt of said second part of said data-address field for transmitting to said index adder a number of the least signficant bits in said predetermined index register dependent upon the information contained in said second part of said data-address field,
means for transmitting to said index adder the data word contained in that one of said index registers whose identity is represented in the index register field of the instruction word in said instruction word register,
said index adder deriving the sum of said first part of said data-address field transmitted thereto, the index register data word transmitted thereto, and either said second part of said data-address field transmitted thereto or said number of the least significant bits transmitted thereto from said predetermined index register,
and means responsive to the operation field contained in said instruction word register for transferring a data word within said data processor in accordance with the sum derived by said index adder.

5. A data processor in accordance with claim 4 further including
a shift circuit connected to said predetermined index register,
and means for selectively transmitting said second part of said data-address field contained in said instruction word register to said shift circuit whenever said second part is transmitted to said read circuit,
said shift circuit shifting the bits in said predetermined index register in accordance with the information contained in said second part of said data-address field.

6. A data processor in accordance with claim 4 further including
a masking circuit for masking data words transmitted to and from said data store in accordance with a mask word contained in a preselected one of said index registers,
and means for controlling the operation of said masking circuit in accordance with the control bit field contained in said instruction word register.

7. A data processor comprising
a data word store,
a plurality of index registers,
an instruction word register representing an instruction word having operation, data-address, index register and control bit fields,
an index adder,
means for transmitting a part of said data-address field in said instruction word register to said index adder,
means responsive to a first representation in said control bit field for transmitting the remaining part of said data-address field to said index adder and responsive to a second representation in said control bit field for transmitting to said index adder a number of the least significant bits in a predetermined one of said index registers dependent upon the information contained in said remaining part of said data-address field,
means for transmitting to said index adder the data word contained in that one of said index registers whose identity is represented in said index register field,
said index adder deriving the sum of the information transmitted thereto,
and means responsive to said operation field for transferring data words within said data processor in accordance with said sum derived by said index adder.

8. A data processor comprising
a data word store,
a plurality of index registers,
an instruction word register representing an instruction word having constant and control parts,
an index adder,
means for transmitting a portion of said constant part to said index adder,
means responsive to a first representation in said control part for transmitting the remaining portion to said constant part to said index adder and responsive to a second representation in said control part for transmitting to said index adder a part of the data word contained in a predetermined one of said index registers in accordance with the information represented by said remaining portion of said constant part,
means responsive to said control part for transmitting to said index adder the data word contained in one of said index registers,
said index adder deriving the sum of the information transmitted thereto,
and means responsive to said control part for transferring data words within said data processor in accordance with the sum derived by said index adder.

9. A data processor comprising
a data word store,
a plurality of index registers,
an instruction word register representing an instruction word having constant and control parts,
an index adder, means for transmitting a portion of said constant part to said index adder, means responsive to a first representation in said control part for transmitting the remaining portion of said constant part to said index adder and responsive to a second representation in said control part for transmitting to said index adder a part of the data word contained in a predetermined one of said index registers in accordance with the information represented by said remaining portion of said constant part, means responsive to said control part for transmitting to said index adder the data word contained in one of said index registers, said index adder deriving an output dependent upon the information transmitted thereto, and means responsive to said control part for performing a data processing operation in accordance with the output derived by said index adder.

10. A data processor in accordance with claim 9 further including means responsive to said second representation in said control part for controlling a logical operation on the data word in said predetermined index register in accordance with the remaining portion of said constant part.

11. A data processor comprising a data word store, a plurality of index registers, an instruction word register for representing an instruction word having a data-address field having a first and a second part and a control bit field, an index adder, means for transmitting the first part of the data-address field of the instruction word in said instruction word register to said index adder, means responsive to the control bit field of the instruction word in said instruction word register for selectively transmitting the second part of said data-address field in said instruction word register to said index adder, and means responsive to the control bit field of the instruction word in said instruction word register for selectively transmitting to said index adder a number of the least significant bits in a predetermined one of said index registers dependent on the information contained in said second part of said data-address field.

12. A data processor in accordance with claim 11 further comprising means for shifting the bits in said predetermined index register in accordance with the information contained in said second part of said data-address field.

13. A data processor comprising a data word store, a plurality of index registers, an index adder for deriving an output dependent upon the information transmitted thereto, a plurality of means for performing data processing operations within said data processor in accordance with an instruction word and in accordance with said output derived by said index adder, means for transmitting to said index adder a variable portion of said instruction word, means for transmitting to said index adder the data word contained in one of said index registers in accordance with said instruction word, means for transmitting to said index adder a part of the data word contained in another of said index registers in accordance with said instruction word, a variable portion of said instruction word transmitted to said index adder having a maximum length, and said part of said index register data word transmitted to said index adder being dependent upon that portion of said instruction word variable portion of maximum length which is not transmitted to said index adder.

References Cited

UNITED STATES PATENTS

| | | | |
|---|---|---|---|
| 3,015,441 | 1/1962 | Rent et al. | 340—172.5 |
| 3,036,773 | 5/1962 | Brown | 340—172.5 |
| 3,061,192 | 10/1962 | Terzian | 340—172.5 |
| 3,239,816 | 3/1966 | Breslin et al. | 340—172.5 |
| 3,247,490 | 4/1966 | Kregness et al. | 340—172.5 |
| 3,249,920 | 5/1966 | Pulver | 340—172.5 |
| 3,284,778 | 11/1966 | Trauboth | 340—172.5 |
| 3,299,261 | 1/1967 | Steigerwalt | 340—172.5 |

OTHER REFERENCES

Beckman, F. S., et al.: Developments in the Logical Organization of Computer Arithmetic and Control Units, in Proceedings of the IRE 49 (1), pp. 53–56, January 1961.

ROBERT C. BAILEY, *Primary Examiner.*

J. P. VANDENBURG, *Assistant Examiner.*